US010856656B2

(12) United States Patent
Dresnick et al.

(10) Patent No.: US 10,856,656 B2
(45) Date of Patent: Dec. 8, 2020

(54) FOLDABLE COLLAPSIBLE PACKING ORGANIZER

(71) Applicants: Susan G. Dresnick, Coral Gables, FL (US); Julito Cartaya, Miami Lakes, FL (US)

(72) Inventors: Susan G. Dresnick, Coral Gables, FL (US); Julito Cartaya, Miami Lakes, FL (US)

(73) Assignee: Susan G. Dresnick, Coral Gables, FL (US)

( * ) Notice: Subject to any disclaimer, the term of this patent is extended or adjusted under 35 U.S.C. 154(b) by 0 days.

(21) Appl. No.: 16/245,616

(22) Filed: Jan. 11, 2019

(65) Prior Publication Data
US 2019/0208903 A1    Jul. 11, 2019

Related U.S. Application Data

(60) Provisional application No. 62/616,082, filed on Jan. 11, 2018.

(51) Int. Cl.
*A47B 46/00*    (2006.01)
*B65G 1/02*    (2006.01)
*A47B 96/02*    (2006.01)
*A47B 43/00*    (2006.01)

(52) U.S. Cl.
CPC .............. *A47B 46/00* (2013.01); *A47B 43/00* (2013.01); *A47B 96/025* (2013.01); *B65G 1/023* (2013.01)

(58) Field of Classification Search
CPC ....... A47B 46/00; A47B 43/00; A47B 96/025; A47B 46/005; A47B 57/045; A47F 5/12; A47F 5/0087; A47F 5/10; A47F 5/108; B65G 1/023

USPC .......................................................... 211/150
See application file for complete search history.

(56) References Cited

U.S. PATENT DOCUMENTS

| 421,540 | A | * | 2/1890 | Barber | A47F 5/116 211/132.1 |
| 426,697 | A | * | 4/1890 | Webb | A47F 5/12 211/150 |
| 485,627 | A | * | 11/1892 | Hamblin | A47F 5/112 108/100 |

(Continued)

*Primary Examiner* — Patrick D Hawn
(74) *Attorney, Agent, or Firm* — Robert M. Schwartz; Alfred K. Dassler

(57) ABSTRACT

A travel organizer stand having a base, a tower pivotably attached to the base and the tower having a tower storage position in which the tower is parallel to the base and a tower use position in which the tower is perpendicular to the base, a shelf is pivotably mounted to the tower, the shelf having a shelf storage position in which the shelf is parallel to the tower and a shelf use position in which the shelf is perpendicular to the tower, and a second shelf pivotably mounted to the tower having a second shelf storage position, in which the second shelf is parallel to the tower and a second shelf use position in which the second shelf is perpendicular to the tower and on an opposite side of the tower than the shelf disposed in the shelf use position, and a third shelf pivotably mounted to the tower having a third shelf storage position in which the third shelf is parallel to the tower and a third shelf use position in which the third shelf is perpendicular to the tower and on a same side of the tower as the shelf disposed in the shelf use position.

6 Claims, 10 Drawing Sheets

(56) References Cited

U.S. PATENT DOCUMENTS

| | | | | |
|---|---|---|---|---|
| 638,443 | A | * | 12/1899 | Canedy .................. A47B 31/04 108/177 |
| 1,554,137 | A | * | 9/1925 | Slifkin .................... A47B 57/52 108/6 |
| 1,647,723 | A | * | 11/1927 | Casali .................... A47B 43/00 108/176 |
| 2,445,164 | A | * | 7/1948 | Worthman ......... A47G 25/0664 160/127 |
| 2,787,382 | A | | 4/1957 | Williams |
| 2,908,397 | A | * | 10/1959 | Patterson ............. A47B 46/005 108/179 |
| 2,919,034 | A | * | 12/1959 | Levy .................... A47B 57/045 108/1 |
| 3,748,010 | A | * | 7/1973 | Garte ..................... A47B 77/10 312/314 |
| D279,740 | S | | 7/1985 | Slager |
| D288,859 | S | | 3/1987 | Huldt |
| 4,678,090 | A | * | 7/1987 | Ross ....................... B62B 3/186 211/150 |
| D324,143 | S | | 2/1992 | Hammond |
| 5,374,073 | A | | 12/1994 | Hung-Hsin |
| 5,505,318 | A | * | 4/1996 | Goff ........................ A47B 46/00 211/132.1 |
| D379,886 | S | | 6/1997 | Towfigh |
| 5,749,480 | A | * | 5/1998 | Wood ..................... A47B 57/04 211/150 |
| 5,816,419 | A | * | 10/1998 | Lamson ............... A47B 57/045 211/150 |
| D429,580 | S | | 8/2000 | Janowitz |
| 6,220,180 | B1 | | 4/2001 | Janowitz |
| 6,471,019 | B1 | | 10/2002 | Miller |
| 6,571,969 | B2 | * | 6/2003 | Larbaletier ............... A47F 5/12 108/106 |
| D494,950 | S | | 8/2004 | Keunecke |
| 6,811,233 | B1 | | 11/2004 | Packer |
| 7,249,680 | B2 | * | 7/2007 | Wang .................... A47B 57/04 211/150 |
| 7,364,129 | B1 | * | 4/2008 | Levari, Jr. ............. A45C 13/00 108/4 |
| 7,900,783 | B2 | | 3/2011 | Fernandez et al. |
| 7,901,018 | B2 | | 3/2011 | Baughman |
| 7,987,955 | B2 | * | 8/2011 | Puchalski ................ A45C 5/14 190/10 |
| 8,281,943 | B2 | * | 10/2012 | Suman .................. A47F 5/0087 211/150 |
| 8,322,291 | B2 | | 12/2012 | Ceballos-Godefroy |
| 8,665,583 | B2 | * | 3/2014 | Kinsley ................ A47B 46/005 211/150 |
| 9,125,486 | B2 | | 9/2015 | Rheault et al. |
| 9,714,045 | B2 | * | 7/2017 | Dhand ...................... B62B 5/06 |
| 9,936,825 | B1 | * | 4/2018 | Lindblom ............. A47F 5/0087 |
| 2008/0142463 | A1 | * | 6/2008 | Johnson ............... A47B 57/487 211/187 |
| 2008/0143069 | A1 | * | 6/2008 | Richards ................ A47F 5/135 280/47.35 |
| 2009/0255771 | A1 | | 10/2009 | Puchalski |
| 2010/0264103 | A1 | * | 10/2010 | Johnson ................. A47B 57/20 211/150 |
| 2011/0068071 | A1 | * | 3/2011 | Suman ................. A47F 5/0087 211/87.01 |
| 2016/0058211 | A1 | * | 3/2016 | Weinstein ............... A47F 5/135 211/190 |
| 2016/0200339 | A1 | | 7/2016 | Dhand et al. |

* cited by examiner

FOLDABLE COLLAPSIBLE PACKING ORGANIZER

CROSS-REFERENCE TO RELATED APPLICATIONS

This application claims the benefit of U.S. Provisional Patent Application No. 62/616,082, filed Jan. 11, 2018, entitled "Foldable Collapsible Packing Organizer" which is incorporated herein by reference in its entirety.

BACKGROUND OF THE INVENTION a) Field of the Invention

The present invention relates to a foldable packing organizer to organize items prior to, and during the process of packing a suitcase when traveling.

b) Description of the Related Art

The present invention is in the art of foldable temporary shelving for organizing items such as clothing and other items for packing into a suitcase for trips.

BRIEF SUMMARY OF THE INVENTION

The present invention is a packing organizer having a tubular frame or tower structure that includes a tower of 2 vertical rods supporting a plurality of foldable shelves. A first foldable horizontal primary shelf, is attached by hinges, at a proximal side, to the tower and two foldable vertical rods are affixed to the opposite distal side of the horizontal primary shelf, to form a base support for the organizer. A second foldable horizontal shelf is attached by hinges at a proximal side to the tower and is located above the primary shelf. A tertiary horizontal shelf is provided intermediate the primary and secondary shelves and is oriented to extend in an opposite direction from the tower as the primary and secondary shelves. The packing organizer has a use position when the shelves are in an open position and a storage position when the shelves are in a folded position parallel to the tower. A clothing rod support for hanging clothing on hangers is attached to or part of at least one shelf. A suitcase may be placed on the primary shelf. In an alternate embodiment, a tower or frame is pivotably attached to a support base, the tower or frame supports hinged shelves that pivot outward from the tower. Both embodiments fold from a use position with the shelves perpendicular to the tower, to a flat or storage position with the shelves parallel to the tower.

It is accordingly an object of the invention to provide a travel organizer stand having a base, a tower pivotably attached to the base, the tower having a tower storage position, in which the tower is parallel to the base and a tower use position in which the tower is perpendicular to the base, a shelf pivotably mounted to the tower, the shelf having a shelf storage position, in which the shelf is parallel to the tower and a shelf use position in which the shelf is perpendicular to the tower, and a second shelf pivotably mounted to the tower, the second shelf having a second shelf storage position, in which the second shelf is parallel to the tower and a second shelf use position in which the second shelf is perpendicular to the tower and on an opposite side of the tower than the shelf disposed in the shelf use position.

In accordance with another feature of the invention a third shelf is pivotably mounted to the tower, the third shelf having a third shelf storage position, in which the third shelf is parallel to the tower and a third shelf use position in which the third shelf is perpendicular to the tower and on a same side of the tower as the shelf disposed in the shelf use position.

In accordance with a further feature of the invention one of the shelves has a slot, the slot being dimensioned for receiving an end of a clothes hanger and supporting the hanger on the one of the shelves.

In accordance with an added feature of the invention one of the shelves has a mounting end and a free end opposite the mounting end, the slot being disposed at the mounting end and substantially parallel thereto.

In accordance with an additional feature of the invention one or more hanger hooks are attached to a side of said tower for receiving an end of a clothes hanger and supporting the clothes hanger on one of said hanger hooks.

In accordance with another mode of the invention, each of the shelves has a respective recess in the tower in which each of the shelves is disposed in the storage position thereof.

In accordance with a further mode of the invention the shelves and the base are co-planer in the storage position.

With the objects of the invention in view, there is also provided a travel organizer stand having a tower, a shelf pivotably mounted to the tower, the shelf having a shelf storage position, in which the shelf is parallel to the tower and a shelf use position in which the shelf is perpendicular to the tower, the shelf having two foldable legs foldable into the shelf in a storage position and away from the shelf in a use position in which the legs support the shelf, and a second shelf pivotably mounted to the tower, the second shelf having a second shelf storage position, in which the second shelf is parallel to the tower and a second shelf use position in which the second shelf is perpendicular to the tower and on an opposite side of the tower than the shelf disposed in the shelf use position.

In accordance with an additional further mode of the invention a third shelf is pivotably mounted to the tower, the third shelf having a third shelf storage position, in which the third shelf is parallel to the tower and a third shelf use position in which the third shelf is perpendicular to the tower and on a same side of the tower as the shelf disposed in the shelf use position.

In accordance with yet an additional feature of the invention one of the shelves has a slot, the slot being dimensioned for receiving an end of a clothes hanger and supporting the hanger on the one of the shelves.

In accordance with still another feature of the invention one of the shelves has a mounting end and a free end opposite the mounting end, the slot being disposed at the mounting end and substantially parallel thereto.

In accordance with another mode of the invention, the slot is defined by a rod mounted at the free end and spaced apart therefrom.

The construction and method of operation of the invention, however, together with additional objects and advantages thereof will be best understood from the following description of specific embodiments when read in connection with the accompanying drawings.

DETAILED DESCRIPTION OF THE PREFERRED EMBODIMENT

Figure 1:
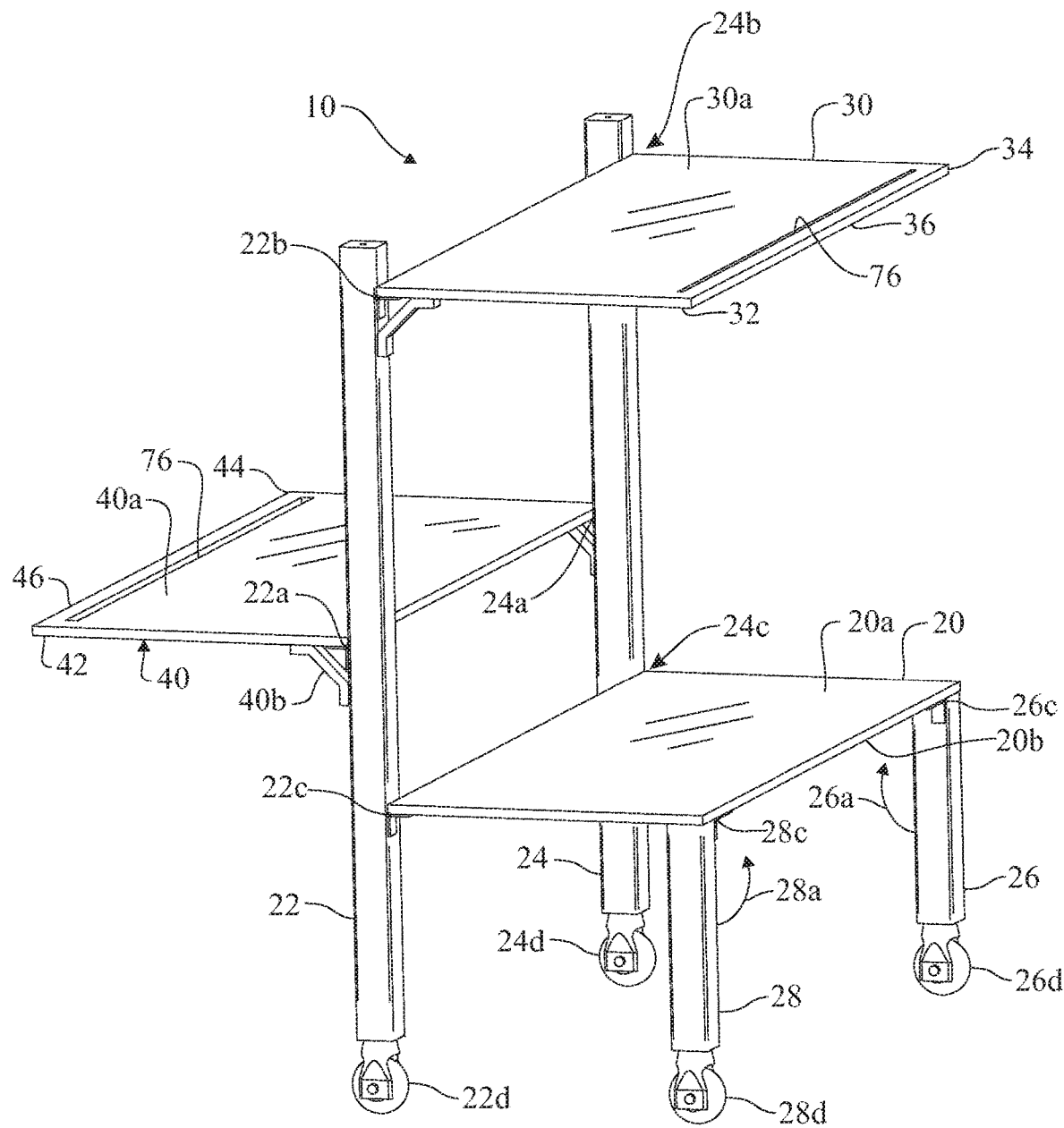
FIG. 1 is a perspective view of one embodiment of the foldable collapsible packing organizer shown in a use position.

The foldable collapsible packing organizer 10 has a first primary shelf 20 supported at a height H above the ground G. In one embodiment shelf 20 is supported by tower columns 22 and 24, and foldable legs 26 and 28. Legs 26 and 28 extend from the ground G to the shelf 20. Columns 22 and 24 are tubular and have a height greater than H.

Shelf 20 has a flat rigid surface 20A that may be used to support a suitcase 50 or to support objects to be packed into a suitcase. Such objects may include clothing articles 52 or other articles 54 such as but not limited to shoes or belts or other clothing accessories including hats to be packed. Surface 20A may be opaque or transparent and of a sufficiently strong material to support a person seated on shelf 20.

Figure 2:
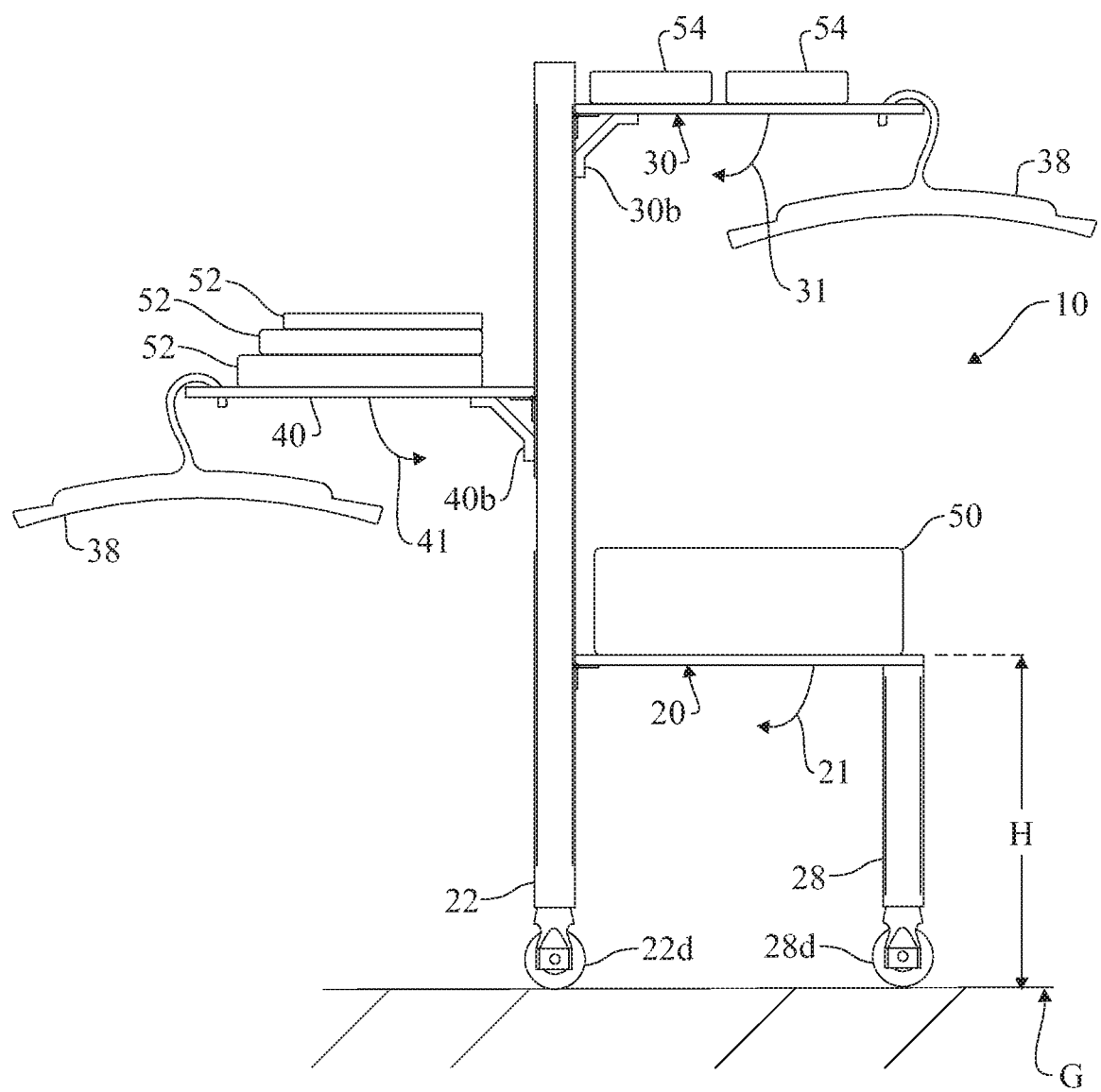
FIG. 2 is a side view of the packing organizer taken from FIG. 1.

A secondary shelf 30 is attached to and supported by columns 22 and 24. Shelf 30 may be attached to columns 22 and 24 in any way known in the art, including use of a bracket 30B as shown in FIG. 2. Shelf 30 has a flat rigid surface 30A to support objects or store objects to be packed into suitcase 50. Surface 30A may be opaque or transparent but is strong enough to support objects on shelf 30. Shelf 20 is rectangular, but may be of any shape including square, triangular or circular. In one embodiment, shelf 30 is above shelf 20, is parallel to shelf 20 and is aligned with shelf 30. Shelf 30 has a distal free end 30d and a proximal mounting end 30p. Extension spacers 32 and 34 may support a rod 36. Rod 36 may support one or more clothing hangers 38 or rod 36 may support other objects such as a towel, a scarf or other items that may be partially wrapped around rod 36.

A tertiary shelf 40 is intermediate shelves 20 and 30, but is orientated on an opposite side of tower columns 22 and 24 as shelves 20 and 30. Shelf 40 may be attached to tower columns 22 and 24 in any way known in the art, including use of a bracket 40B as shown in FIGS. 1 and 2. Shelf 40 has a flat rigid surface 40A to support objects or store objects to be packed into a suitcase 50. Surface 40A may be opaque or transparent but is strong enough to support objects on shelf 40. Shelf 40 is rectangular, but may be of any shape including square, triangular or circular. Shelf 40 may also have extension spacers 42 and 44 to support a rod 46. Rod 46 may support one or more clothing hangers 38 or rod 46 may support other objects such as a towel, a scarf or other items that may be partially wrapped around rod 46.

Shelves 20 and 40 each have a respective distal free end 20d and 40d and a respective proximal mounting end 20p and 40p.

In a preferred embodiment, shelf 40 is in a parallel plane above shelf 20 and below shelf 30. Shelf 40 is parallel to shelves 20 and 30 and as stated above extends from tower columns 22 and 24 in the opposite direction as shelves 20 and 30, such that shelves 20 and 30 extend from tower columns 22 and 24 in one direction and shelf 40 extends from columns 22 and 24 in the opposite direction.

Shelves 20, 30 and 40 and tower 60 and base 62 are rigid, may be of a wood material or similar material for shelving. The shelves and tower are substantially rectangular, but may be of any shape including square, triangular or circular.

In use, organizer 10 may be used as an organizer to assist a person in packing for a trip. Shelf 20 may be designed to support a suitcase 50 or other totes or containers for traveling. Shelves 20, 30 and 40 can be used to support items such as clothing 52 or other articles 54 that a person would want to first bring to the organizer 10, then organize them on the organizer 10 shelves 20, 30 and 40, prior to placing them and packing such items in the suitcase. Likewise, items can be hung on hangers 38 on rods 36 and 46 prior to being placed in a suitcase. The suitcase 50 may be on the shelf 20 or in a nearby location.

Further, organizer 10 can be portable having wheels with locking mechanisms at the bases of the tower columns 22 and 24 or foldable legs 26 and 28. Organizer 10 may also be foldable into a relatively flat storage position such that organizer 10 can be stored away such as in a closet or under a bed so as not to take up much room when not in use. Additionally, organizer 10 may be a permanent organizer as a piece of furniture.

Organizer 10 can be folded to be in a relatively flat storage position. In one such embodiment, shelf 40 can be hingedly affixed at 22A and 24A to columns 22 and 24 to allow shelf 40 to fold against tower columns 22 and 24 as shown by arrow 41. Similarly, shelf 30 can be hingedly affixed at hinge location 22B and 24B to tower columns 22 and 24 to allow shelf 30 to fold against tower columns 22 and 24 as shown by arrow 31. Likewise shelf 20 can be hingedly affixed at hinge locations 22C and 24C to tower columns 22 and 24 to allow shelf 20 to fold against tower columns 22 and 24 as shown in arrow 21. This latter operation would be performed after legs 28 and 26, being hingedly fixed at hinge locations 26C and 28C to shelf 20, to allow leg 28 to fold upward toward and against shelf edge 20B as shown in arrow 28A, and leg 26 to fold upward toward and against shelf edge 20B as shown in arrow 26A, in this manner, legs 26 and 28 would be folded inwardly toward one another so that shelf 20 would lie relatively flat against columns 22 and 24 when in the folded storage position. As described, organizer 10 in the folded storage position can be stored in a relatively flat condition. In the folded storage position, shelves 20, 30 and 40 are parallel to the tower columns 22 and 24.

Organizer 10 can also be movable. Wheels 22d, 24d, 26d and 28d roll and swivel in any direction to allow organizer 10 to be rolled in any direction by the user.

Figure 3:
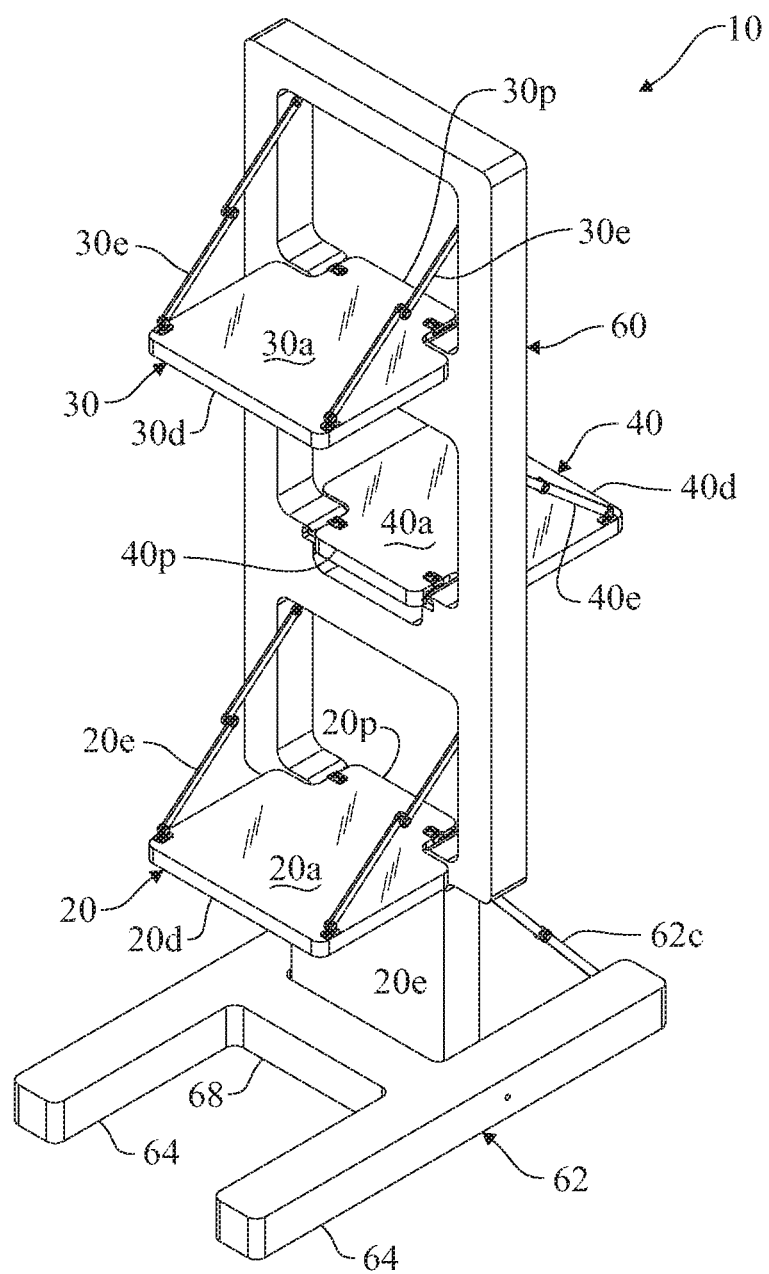
FIG. 3 is a perspective view of an alternate embodiment of the packing organizer shown in a vertical standing use position.
Figure 4:
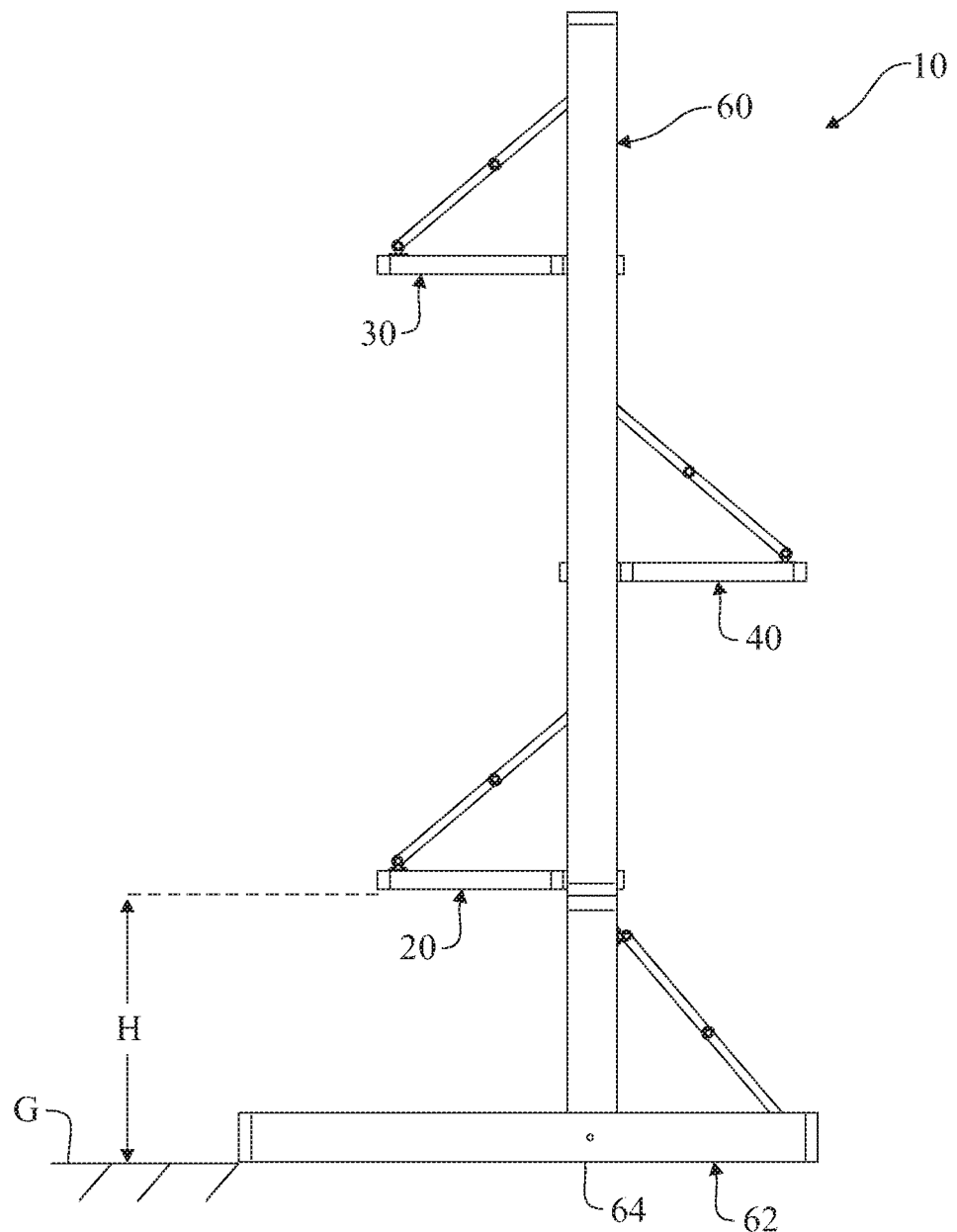
FIG. 4 is a side view of the packing organizer shown in FIG. 3, both the left side view and the right side view are mirror images of one another.
Figure 5:
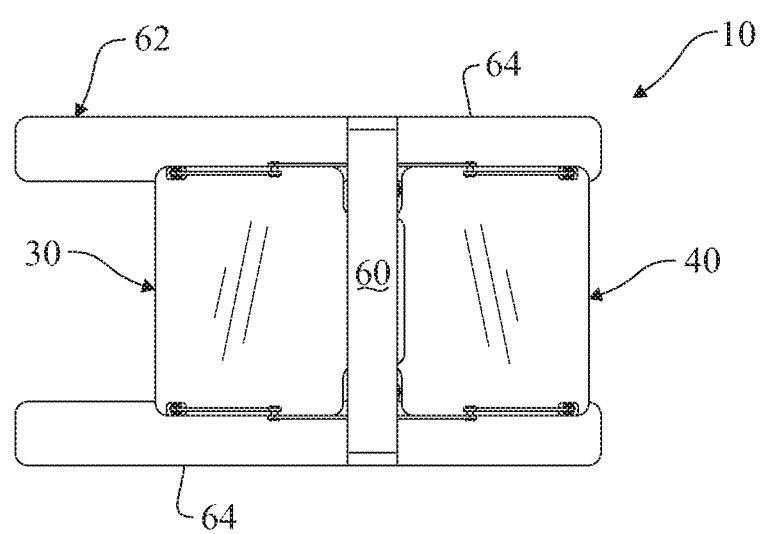
FIG. 5 is a top view of the packing organizer shown in FIG. 3.
Figures 6, 7:
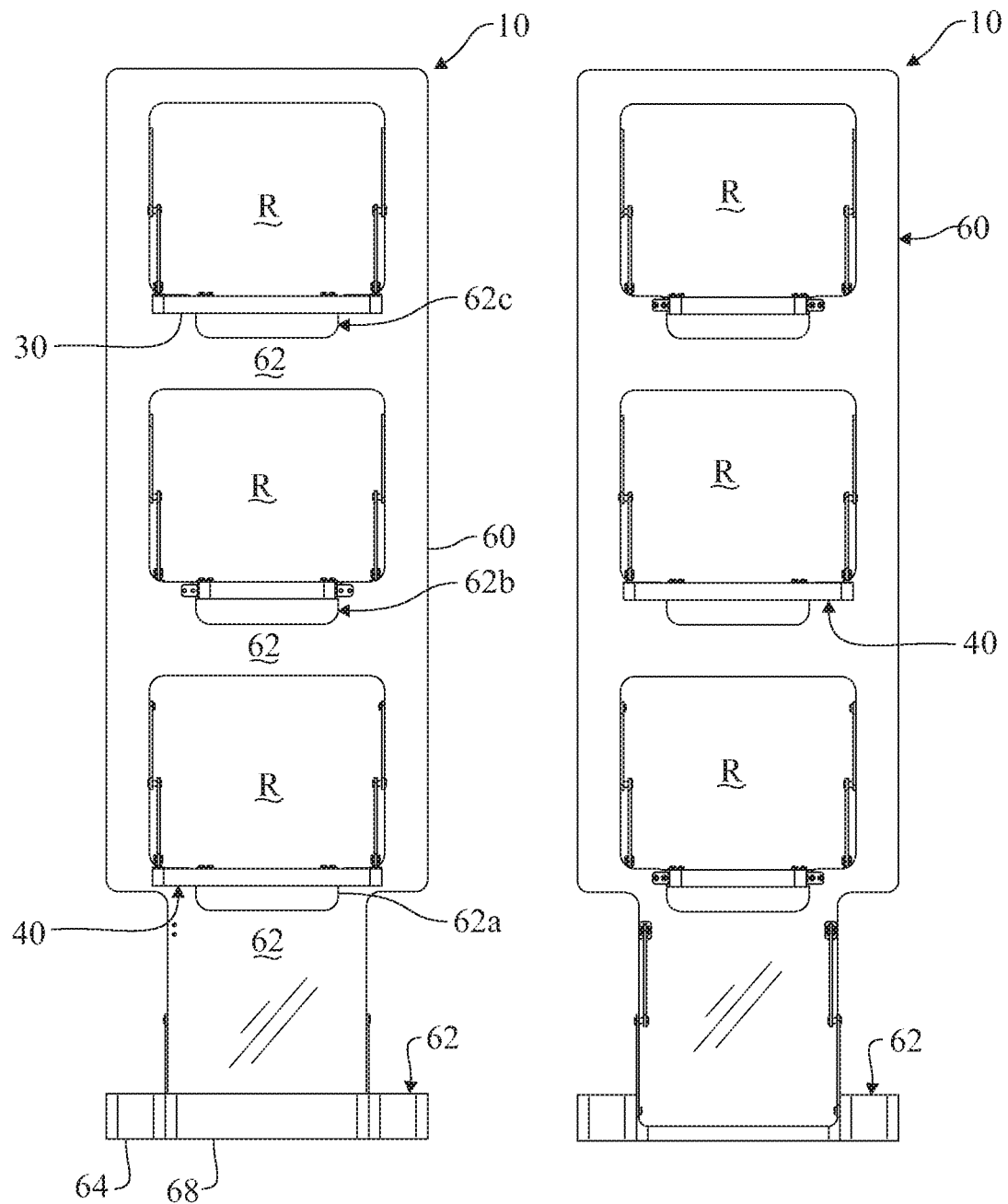
FIG. 6 is a front view of the packing organizer shown in FIG. 3.
FIG. 7 is a rear view of the packing organizer shown in FIG. 3.

In an alternate embodiment, as shown in FIGS. 3 to 13, a tower 60 is pivotably mounted on a base 62. Base 62 has opposed parallel runners 64 connected by a perpendicular support bar 68. Tower 60 is hinged at the base 62 at or near the support bar 68 in a manner known in the art. As shown in FIG. 3, tower 60 includes a first shelf 20, a second shelf 30 and a tertiary shelf 40. Each of said shelves is pivotable relative to tower 60 such that shelves 20, 30 and 40 fold from a first use position where each said shelf 20, 30 and 40 is perpendicular to tower 40 to a storage position where each shelf is parallel to tower 60 as shown in FIGS. 6, 7, 8 and 9. Also as shown in FIGS. 6, 7, 8 and 9, shelves 20, 30 and 40 are in the same plane as tower 60 and base 62 and are co-planar.

Figure 11:
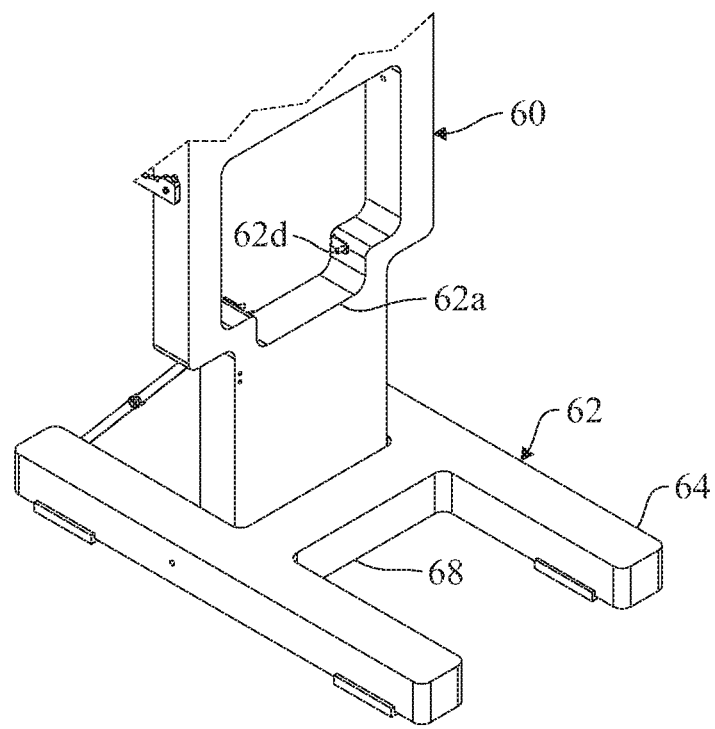
FIG. 11 is a partial perspective view of a portion of the tower of the packing organizer of FIG. 3 showing a male hinge assembly.
Figure 12:
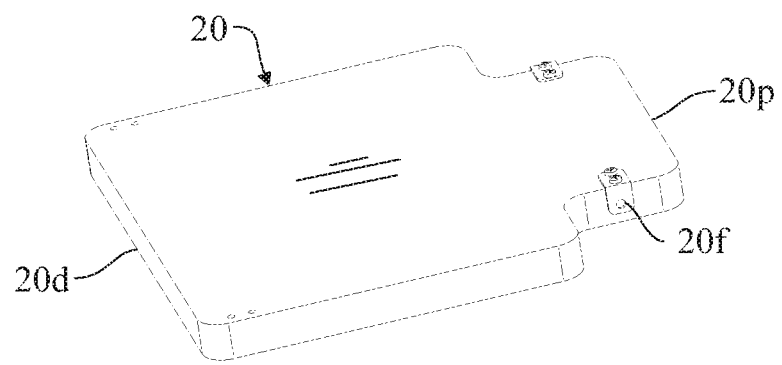
FIG. 12 is a perspective view of a shelf showing a female hinge assembly.
Figure 13:
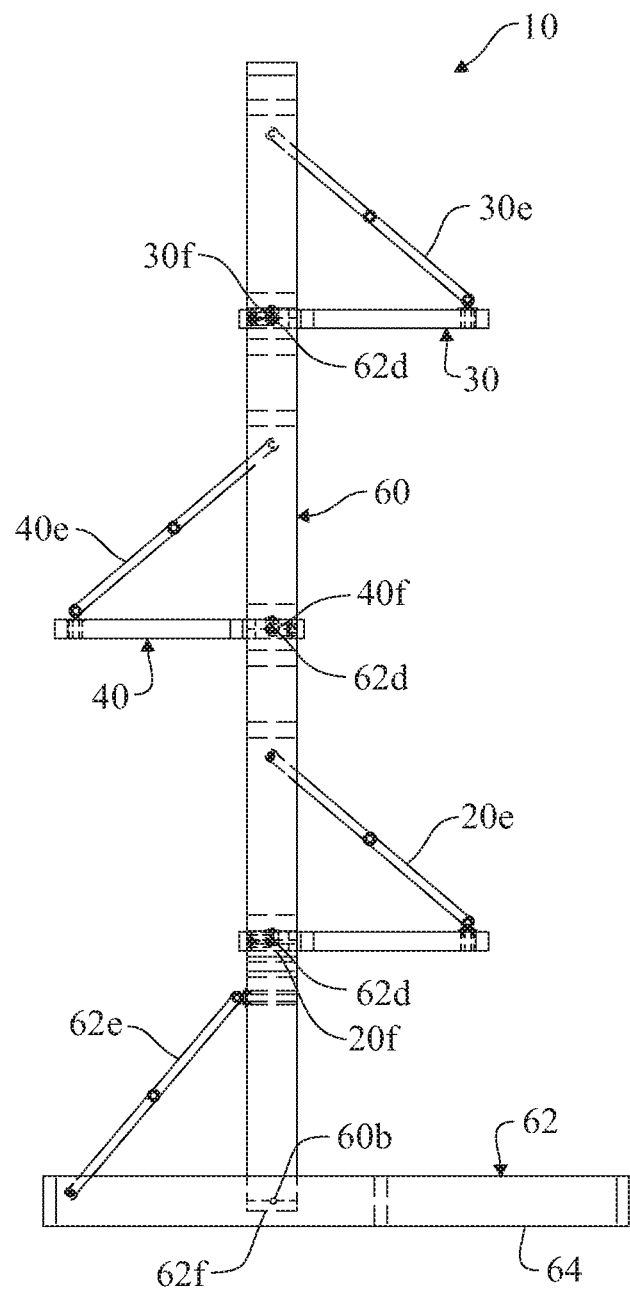
FIG. 13 is a side view of the packing organizer of FIG. 3 showing in hidden views the hinges and shelf support brackets in phantom.

Tower 60 supports each shelf 20, 30 and 40, and each said shelf is pivotable from a respective cross bar 62a, 62b and 62c, where each of said cross bars are integral parts of tower 60. Each shelf 20, 30 and 40 has a distal free end 20d, 30d and 40d and a proximal hinged end 20p, 30p and 40p. Each shelf 20, 30 and 40 has a hinge assembly at the hinged ends 20p, 30p and 40p with the respective cross bars 62a, 62b and 62c. As an example, as shown in FIGS. 11 and 12, at the respective cross bar 62a has a protrusion 62D that is constructed and arranged to fit in an opening 20F of shelf 20 to receive the respective protrusion 62D. Each shelf 20, 30 and 40 has at each side of the respective shelf at the hinged end 20p openings 20F to receive the protrusions 62D from the respective cross bar 62A. Each cross bar 62A, 62B and 62C has opposed protrusions 62D at each inner side of the opening at the respective cross bar. The hinge assemblies are as known in the art. Each shelf 20, 30 and 40 has one or more hinged support arms 20e, 30e and 40e extending from the tower 60 to the distal end of each shelf. Likewise, base 62 has one or more hinged support arms 62e extending from tower 60 to base 62. The support arms provide additional support to each shelf and to the base 62 and tower 60.

Tower 60 is hinged at base 62, with a similar arrangement as heretofore described, where opposed protrusions 60B at the base of tower 60 fit into openings 62F in the base 62.

Figures 8, 9:
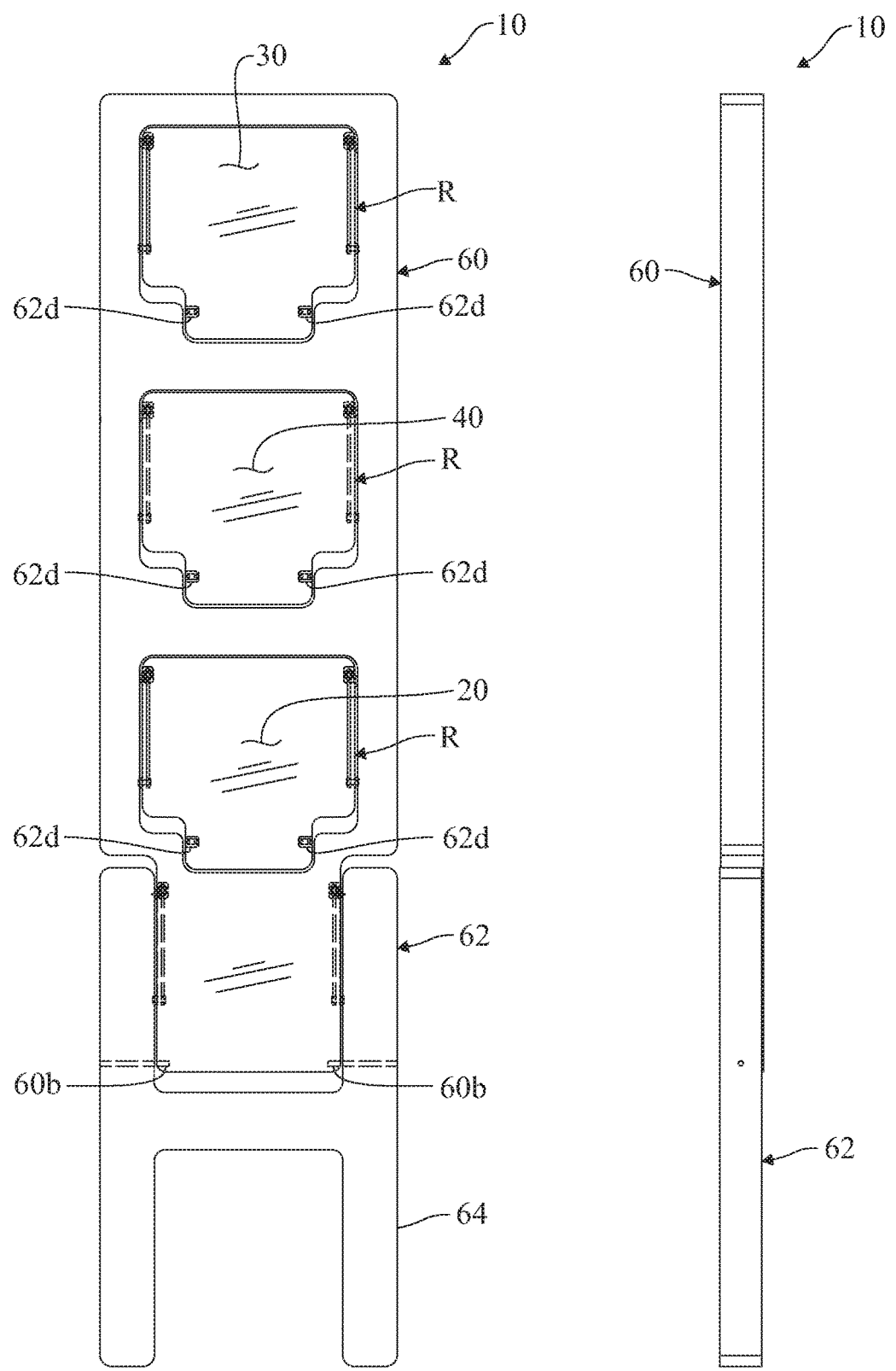
FIG. 8 is a rear view of the packing organizer shown in FIG. 3 shown in a storage position.
FIG. 9 is a side view of the packing organizer shown in FIG. 8.

Further as shown in FIGS. 8 and 9, when each shelf is in a storage position and the tower 60 is pivoted to the same plane as base 62, the profile of the organizer is entirely flat such that the stand 60, base 62 and shelves 20, 30 and 40 are parallel and are co-planar in the same plane. In this folded flat storage position, the organizer 10 can be stored in this storage position in a closet or under for example a bed.

Figures 10, 10A:
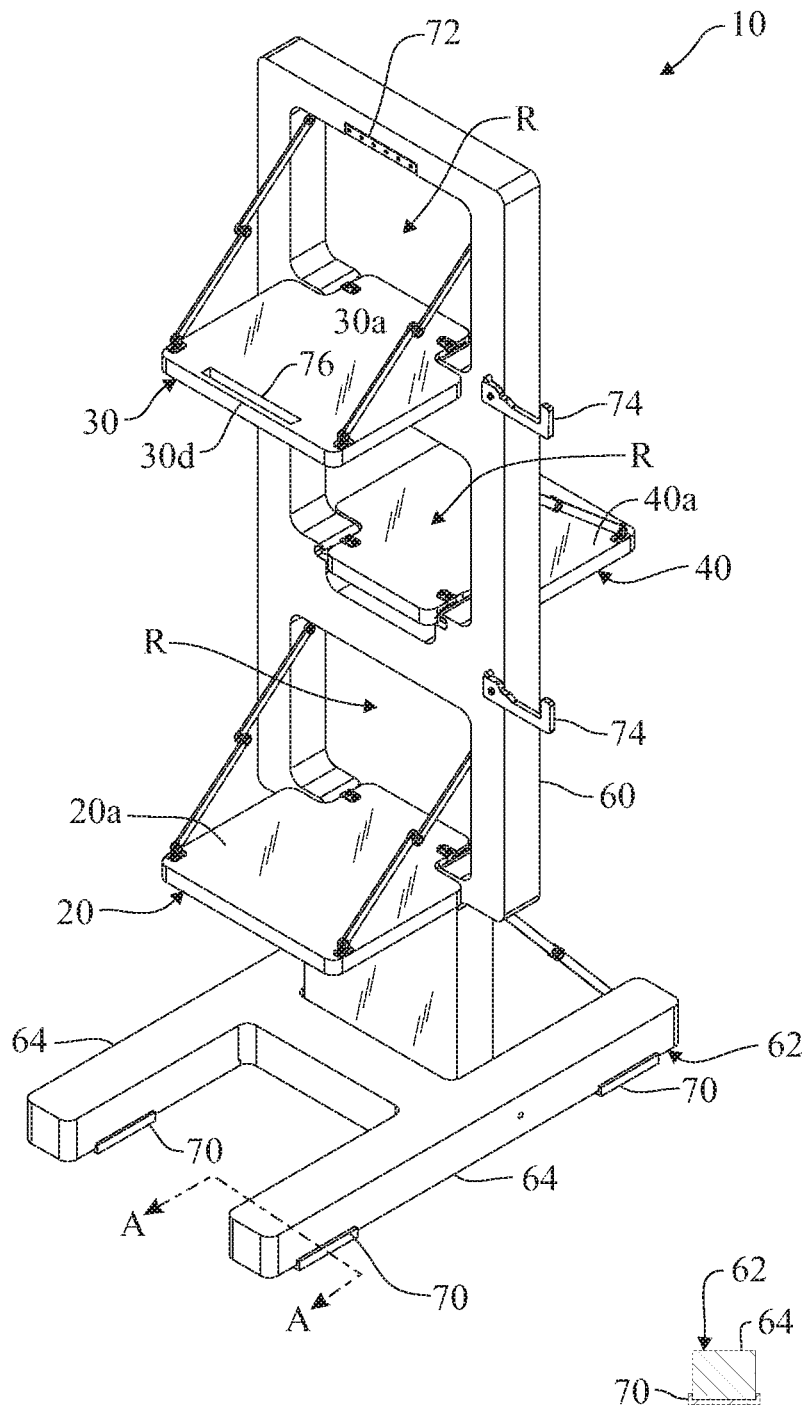
FIG. 10 is a perspective view of the packing organizer similar to that shown in FIG. 3 but with several additional features shown thereon.
FIG. 10A is a cross sectional view of a portion of the base, taken along lines A-A of FIG. 10.

Additionally, as shown in FIGS. 10 and 10A, base 62 may have thin flat plastic runner strips 70 at the floor side of each runner 64 to allow for the organizer to slide over a floor or carpet.

Each of shelves 20, 30 and 40 has a respective recess R in tower 60 in which each of said shelves is disposed in the storage position.

Also as shown in FIG. 10, an LED light strip 72 or other type of light, powered by a battery for example may be attached to the organizer 10 and be incorporated therein to provide illumination for a user if in a physical setting without light. External foldable hooks 74 may be placed or incorporated at the sides of tower 60 to support clothing items or clothing hangers or other objects as needed.

In a preferred embodiment, the shelves 20, 30 and 40 would be rectangular and approximately 14 inches deep and 16 inches wide. Additionally, a preferred embodiment may be made of wood, the shelves and the frame would be one half inch to three quarters of an inch thick.

A through slot 76 can be located at the distal end of shelves 20, 30 and 40 and as shown for example at the distal end 30d of shelf 30 in FIG. 10, to receive and support a clothes hanger (not shown) or other items.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

We claim:

1. A travel organizer stand comprising:
   a base;
   a tower pivotably attached to said base, said tower having recesses delimited from one another, said tower having a tower storage position, in which said tower is parallel to said base and a tower use position in which said tower is perpendicular to said base;
   a shelf pivotably mounted to said tower, said shelf having a shelf storage position, in which said shelf is parallel to said tower disposed in a first recess of said recesses and a shelf use position in which said shelf is perpendicular to said tower, said first recess having a profile matching an outer edge contour of said shelf; and
   a second shelf pivotably mounted to said tower, said second shelf having a second shelf storage position, in which said second shelf is parallel to said tower disposed in a second recess of said recesses and a second shelf use position in which said second shelf is perpendicular to said tower at a different height position on said tower than said shelf disposed in said shelf use position, and is on an opposite side of said tower than said shelf disposed in said shelf use position, said second recess having a profile matching an outer edge contour of said second shelf.

2. The travel organizer stand according to claim 1, further comprising a third shelf pivotably mounted to said tower, said third shelf having a third shelf storage position, in which said third shelf is parallel to said tower and a third shelf use position in which said third shelf is perpendicular to said tower and on a same side of said tower as said shelf disposed in said shelf use position.

3. The travel organizer stand according to claim 2, wherein one of said shelves has a slot, said slot being dimensioned for receiving an end of a clothes hanger and supporting the hanger on said one of said shelves.

4. The travel organizer stand according to claim 3, wherein said one of said shelves has a mounting end and a free end opposite said mounting end, said slot being disposed at said mounting end and substantially parallel thereto.

5. The travel organizer stand according to claim 2, wherein one or more hanger hooks are attached to a side of said tower for receiving an end of a clothes hanger and supporting the clothes hanger on one of said hanger hooks.

6. The travel organizer stand according to claim 1, wherein said tower, said shelves and said base are coplaner in said storage position.

* * * * *